Nov. 11, 1969  G. C. VAN DE MEERENDONK  3,477,077
MACHINE FOR CUTTING INTERNAL THREAD IN PERFORATED OBJECTS
Filed June 5, 1967  2 Sheets-Sheet 1

INVENTOR
Gerardus Cornelis
van de Meerendonk
BY
Pennie Edmonds Morton,
Taylor and Adams
Attorneys

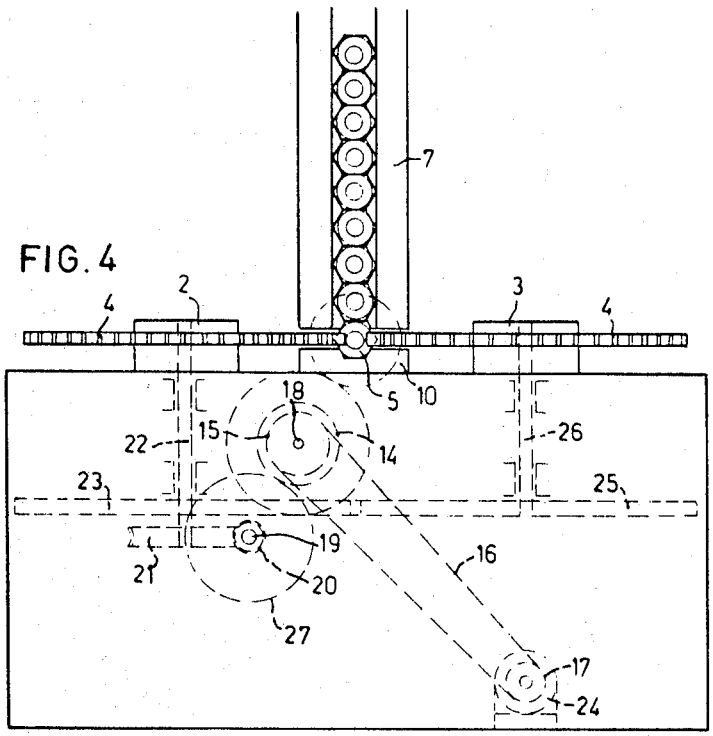
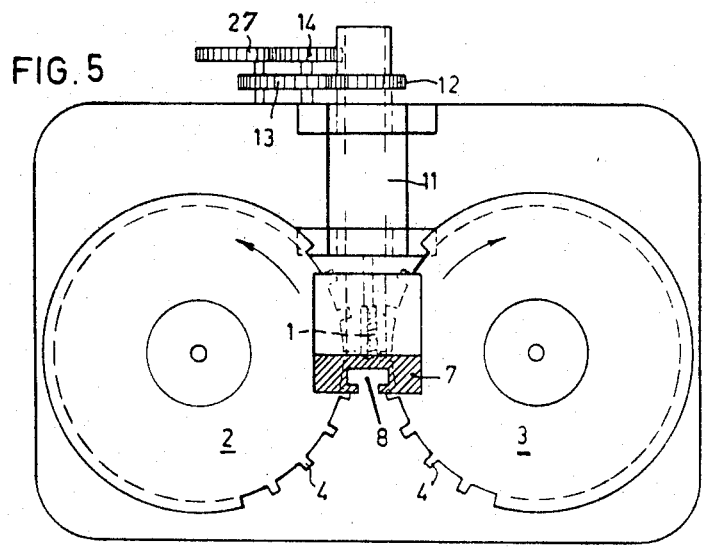

United States Patent Office 3,477,077
Patented Nov. 11, 1969

3,477,077
MACHINE FOR CUTTING INTERNAL THREAD IN PERFORATED OBJECTS
Gerardus Cornelis van de Meerendonk, Helmond, Netherlands, assignor to Nedschroef Octrooi Maatschappij N.V., Helmond, Netherlands, a limited liability company of the Netherlands
Filed June 5, 1967, Ser. No. 643,478
Claims priority, application Netherlands, June 6, 1966, 6607808
Int. Cl. B23g 1/18, 11/00
U.S. Cl. 10—139   9 Claims

ABSTRACT OF THE DISCLOSURE

The disclosure is of a machine for cutting internal thread in perforated objects such as nut blanks and the like, and more particularly in a continuous series of said objects having substantially the same shape and dimensions. The machine includes a continuously rotatable tapping tool or tap for cutting thread in the bores of the objects, a feeding mechanism comprising a pair of oppositely rotatable toothed discs located in the plane of the tap at its respective sides for receiving the perforated objects and feeding them to the tap, and means for synchronizing the rate of rotation of said discs with the rate of advance of the objects as effected by said tap.

CROSS-REFERENCE TO CORRESPONDING APPLICATION

This application corresponds to an application filed in the Netherlands on June 6, 1966, No. 66.07808, the priority of which is claimed.

BACKGROUND OF INVENTION

Field of the invention

The present invention relates to a machine for cutting internal thread in perforated objects such as nut blanks and the like, and more particularly to an improved mechanism for feeding perforated objects to a tapping tool.

Description of the prior art

The prior art discloses machines of the above type which include a feeding mechanism for the perforated objects, a continuously rotating tap for cutting a thread in the bores of such objects, and a discharge means for discharging the threaded objects along the shank of the tap. The feeding mechanism of these known machines vary greatly, one including a pair of adjustable endless chains, for holding a nut blank from turning, as illustrated by U.S. Patent No. 150,726. A three roller feeding mechanism is also known which must be adjusted synchronously with the tap. Other U.S. patents of interest in connection with the invention are: 813,559; 2,159,708; 2,180,536; and 3,233,259.

The manner of feeding and supporting the perforated objects by known mechanisms have the disadvantage that the objects in certain cases are supported beyond the tapping die so that they remain under tension after the thread has been made and, therefore, may be damaged. Also, known feeding, supporting and discharge mechanisms are in general complicated and the dismounting of the supply or feed mechanism in case of clogging or the like is not simple.

The problems presented by known constructions are overcome by the improvements provided by the present invention in that the mechanism for feeding the perforated objects to the tap comprises two similar slightly spaced oppositely rotatable, continuously driven discs, the axes of which are perpendicular to the axis of the tap. In this construction the discs have similar peripheral portions for engaging the objects comprising similar teeth, and the tap is located in the space between the discs. The objects are delivered into the peripheral portions of the discs, into a cavity between adjacent teeth of both discs in front of the tap, onto a guide extending along the tap, with the bores of the objects aligned with the tap. The guiding means for the objects provides spaced guideways on opposite sides of the tap which are adapted to prevent rotation of the objects during tapping. In an advantageous construction the discs are provided with teeth having spacings such that the objects delivered edgeways are receivable therein and are advanced onto the tap, as the teeth on said discs move in unison toward the feed end of the tap.

SUMMARY OF THE INVENTION

The machine disclosed in the present application is of the type used for cutting internal threads in perforated objects such as nut blanks and the like, and more particularly for threading a continuous series of objects having substantially the same shape and dimensions, comprising a mechanism for feeding the perforated objects, a continuously rotating tap for cutting a thread in the bores of the objects, and a means for discharging the threaded objects from the tap and its shank. The machine includes means for synchronizing the rate of the feeding mechanism with the rate of advance of the objects by the rotation of the tap.

More particularly, the invention is directed to a threading machine comprising two similar slightly spaced, oppositely rotatable and continuously driven toothed discs, with their axes perpendicular to that of the tap, as described above. These discs comprise the feeding means for the objects to be tapped, and the tap itself is located in the space between these discs, so that the objects are delivered into the peripheral portions of the discs where they are engaged by the teeth, in front of the tap and onto a guide member which also extends along the tap. This guide member is a part of a guiding mechanism including two spaced members located on opposite sides of the tap and which are adapted to prevent rotation of the objects during their advance along the tap.

In a preferred embodiment of the machine according to the invention the peripheral portions of the discs are provided with teeth with such spacings that the objects delivered edgeways thereto are receivable therein and are fed to the tap and moved thereonto at a set rate.

BRIEF DESCRIPTION OF DRAWINGS

The drawings forming a part of this application show an embodiment of the machine according to the invention, which embodiment is illustrated by way of example.

In the drawings:

FIG. 4 is a diagrammatic front elevational view of the machine as shown in FIG. 3; and FIG. 5 is a diagrammatic view of the machine showing the machine in plan from a horizontal section taken on the line V—V of FIG. 3.

DESCRIPTION OF PREFERRED EMBODIMENT

Figure 1:
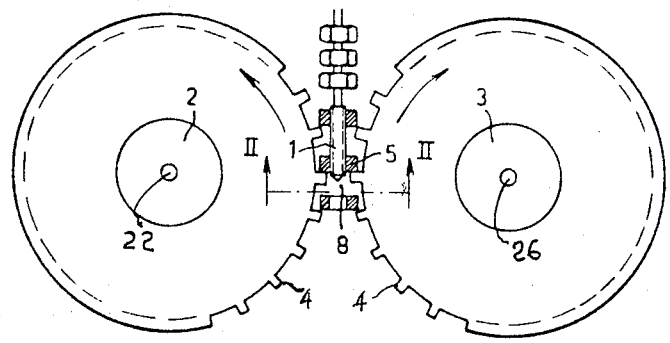
FIG. 1 is a diagrammatic plan view of the feeding mechanism with other parts of the machine left off.
Figure 2:
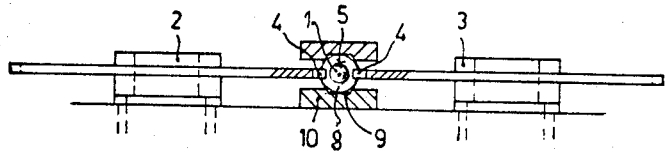
FIG. 2 is a diagrammatic front view showing a section along the line II—II of FIG. 1.

In accordance with the invention, the improved mechanism, illustrated diagrammatically in the drawings, for feeding perforated objects to be threaded to a tap is described in connection with the threading of hexagonal nut blanks 5 as an example. The mechanism for directly and positively feeding the nut blanks to a tap 1 comprises similar discs 2 and 3 and spaced slightly on each side of the tap. These discs 2 and 3 are provided with equally spaced teeth 4. The nut blanks 5 are fed downwardly through a chute 7 into a cavity 8, between four teeth 4 in front of cap 1, onto a guide 10 onto which the nut blanks are delivered between pairs of adjacent teeth 4 of the discs 2 and 3. The bottom sides 9 of the nut blanks 5 are supported in the groove of the guide 10 and are advanced by the discs 2 and 3, driven at the same rate and fed onto the tap 1. As each nut blank 5 is moved out of the cavity 8 in front of the tap, the next nut blank drops into place and the operation continues at the speed of rotation of the tap 1, which is rotated continuously.

The tap 1 is located between the guide 10 and a similar grooved guide 10', both of which may be integral with each other and the chute 7 or may be clamped together so that they hold the nut blanks against rotation during the tapping operation. Nut blanks are supplied from the hopper 6 to the chute 7 in a known manner and the threaded nuts delivered onto the shank of the tap 1 are discharged through the tap head 11 in a manner known in the prior art.

Figure 3:
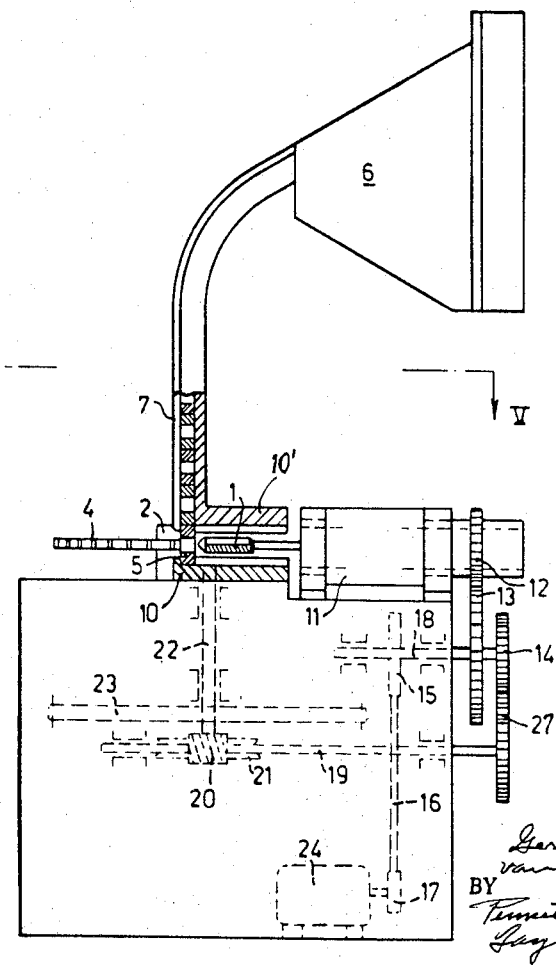
FIG. 3 is a diagrammatic side elevational view of the machine with parts broken away and shown in section.

The driving mechanism for the tapping mechanism of the tapping machine embodying the invention, and as shown in FIGS. 3 and 4 of the drawings comprises the tap 1 carried by a shank driven through a tap head 11, by an electric motor 24 through gears 12, 13 and a V-belt drive transmission 15, 16, 17, the latter of which drives an intermediate shaft 18 on which gears 13 and 14 are mounted. The gear 14 meshes with a gear 27 fixed to shaft 19 which carries a worm 20 cooperating with a worm wheel 21 on a vertical shaft 22, on the top of which feed disc 2 is mounted. The shaft 22 also carries a gear 23 meshing with a similar gear 25 fixed to a vertical shaft 26 on the top of which the other supply or feed disc 3 is mounted.

Since the rate of advance or the feed rate of the object to be threaded by means of the teeth 4 of the discs 2 and 3 must be equal to the rate at which the rotating tap 1 displaces the object, the number of revolutions of the discs 2, 3 must be adjusted to the number of revolutions of the tap 1.

This is accomplished by means of the aforementioned cooperating gear system, wherein the intermediate shaft 18 carries and drives the gear 14 that meshes with the gear 27 on the shaft 19. Shaft 19 and worm 20 drive the worm wheel 21 on the vertical shaft 22, which carries the feeding disc 2. On shaft 22 there is also a gear 23 meshing with the gear 25 of the same size on the vertical shaft 26 carrying the other feeding disc 3. The shaft 18 carrying gear 14 also drives gears 13 and 12 and the tap-rotating head 11. In this way the number of revolutions of the feeding discs 2 and 3 may be derived from the number of revolutions given to the tap 1, and the various gears are selected accordingly.

Since the displacement of the objects by the tap 1 per revolution is proportional to the pitch of the screw thread to be tapped, the rate at which discs 2 and 3 are rotated must be altered when objects are to be threaded with a tap having a screw thread with a different pitch. For that purpose the gears 14, 27 mounted on the shafts 18, 19 are exchangeable for other gears providing the desired rate. By using gears having different number of teeth, the rate of revolution of feed discs 2 and 3 of a given diameter can be adapted to the rate of displacement of the objects 5 by the rotation of the tap 1. The rates of feed and tapping may be synchronized in any other suitable way. For example, the gears 12 and 13 may be exchanged for other gears for reducing or increasing the rate of rotation of the tap 1.

The positioning of the discs 2 and 3 with respect to each other and the tap 1 is such as to take care of blanks having some variation in outside dimension, but where a considerable change is made, it may be necessary to replace the discs 2 and 3 with discs adapted to the particular size of the perforated objects to be threaded. This will also be true of the guides 10 and 10', which, of course, may be made adjustable with respect to each other. The size and characteristics of the tap may also be changed to accord with the blanks to be processed.

It will be understood that the parts of the apparatus, as illustrated diagrammatically in the drawings, may not be drawn to any particular scale or size relationships. However, the feed discs 2 and 3, as illustrated, are properly quite large with respect to the length of the tap, so that they give a speed to the blanks 5 which is as near as possible to or equal to the speed at which the blanks 5 are advanced by the rotation of the tap 1. Since the tap is not shiftable longitudinally, it advances each blank 5 at a rate derived from its rate of rotation. The primary function of the feed discs 2 and 3 is to feed the blanks 5 in succession onto the tap 1 at the speed they are later advanced by the rotation of the tap. Those skilled in the art and familiar with the relationships shown in FIG. 1 with respect to the discs 2 and 3, their teeth 4 and the tap 1 will understand from the foregoing what is required and the synchronization necessary to get the blanks 5 onto the rotating tap 1.

I claim:

1. A machine for cutting internal thread in a continuous series of perforated objects such as nut blanks and the like, including a continuously rotatable tapping means or tap for cutting the thread in said perforated objects, object-guiding means including stationary cooperating guide members in spaced and opposed relationship to one another and extending along opposite longitudinal sides of the tapping means in spaced relation thereto for guiding the objects to be tapped in a path leading to and along the tapping means while preventing their rotation, and mechanism for feeding said objects to the object-receiving or front end of the tapping means, wherein the improvement comprises a mechanism for feeding perforated objects to the tapping means which includes two similar oppositely rotatable disc-like feed members having similar peripheral portions for engaging said objects, peripheral portions of said feed members being respectively located on opposite sides of the tapping means and extending between said stationary guide members with the axes of rotation of the feed members perpendicular to the axis of the tapping means, and means for delivering objects to be tapped to a position directly in front of said tapping means in a position such that they are engaged by the peripheral portions of said feed members, moved thereby along said path and stationary guide members and fed to the tapping means.

2. A machine as claimed in claim 1, wherein the peripheral portions of the disc-like feed members include similar generally radial teeth, the spaces between which on the feed members are aligned and of sizes such that the objects to be threaded are receivable therein and between said guide members in positions wherein their perforations are aligned with the tapping means.

3. A machine as claimed in claim 2, wherein the projecting ends of the teeth of the feed members are spaced from the tap as they approach the front end of and move by the tap.

4. A machine as claimed in claim 1, wherein said stationary guide members are each provided with a longitudinal groove extending parallel to and facing the tapping means and arranged to receive a part of the object while being tapped.

5. A machine as claimed in claim 1, wherein the delivery means comprises a chute extending to the object-guiding means for guiding the objects to be tapped oriented in edgewise arrangement, with their bores parallel to the tapping means.

6. A machine as claimed in claim 1, wherein drive mechanism is provided for synchronizing the rate of movement of the peripheral portions of said feed members with the rate at which the tapping means advances the objects being tapped, and wherein the diameters of the disc-like members are large compared to the length of the tapping means, so that uniform rotational movement of the disc-like members promotes practically uniform linear movements of the perforated objects to and along the tapping means.

7. A machine as claimed in claim 1, including means for rotating the feeding members to move their peripheries in a direction toward the object-receiving end of the tapping means at a rate related to normal movement of the objects along the tapping means.

8. A machine as claimed in claim 2, wherein the disc-like feed members are located in the same plane with their teeth equally spaced, and wherein the teeth on one feed member are directly opposite teeth on the other feed member in the area of said object-receiving end of the tapping means.

9. A machine as claimed in claim 1, wherein the disc-like feed members are parallel to a plane extending longitudinally of the stationary guide members and through the axis of rotation of said tapping means.

References Cited

UNITED STATES PATENTS

| 150,726 | 5/1874 | Stockwell | 10—139 |
| 678,813 | 7/1901 | Riggs | 10—139 |
| 813,559 | 2/1906 | Koester | 10—139 |
| 1,573,099 | 2/1926 | Smith et al. | 10—139 |
| 1,905,715 | 4/1933 | Ingram et al. | 10—139 |
| 2,159,708 | 5/1939 | Pruitt | 10—139 |
| 2,180,536 | 11/1939 | McLaughlin | 10—139 |
| 3,233,259 | 2/1966 | MacLean et al. | 10—139 |

CHARLES W. LANHAM, Primary Examiner

E. M. COMBS, Assistant Examiner

U.S. Cl. X.R.

10—169